INVENTOR.
Wilbur W. Castor

United States Patent Office 3,023,155
Patented Feb. 27, 1962

3,023,155
OZONE GENERATOR
Wilbur W. Castor, 746 Shady Lane, Pittsburgh 34, Pa.
Filed Mar. 16, 1960, Ser. No. 15,497
9 Claims. (Cl. 204—320)

This invention relates to the conversion of oxygen to ozone, and is for an improved apparatus for more effectively accomplishing this result, and to a method of manufacturing an electrode therefor.

In the manufacture of ozone, air or air enriched with oxygen is passed through a corona in a high voltage field between two electrodes. In my copending application with Enno A. Knoche, Serial No. 748,876, filed July 16, 1958, there is disclosed an apparatus in which one electrode is formed of porous carbon, and air is introduced at the center of a rod of porous carbon and diffuses through the carbon to the exterior where it enters the corona at the surface of the electrode.

The present invention has for its object to provide an ozone generator in which the air is more intimately and intensely ionized by passing it through a porous mass of conductive particles insulated from one another by a surface film whereby innumerable tiny discharges or coronas may be generated within the porous interstices through which the air, broken up into small streams of relatively low velocity, is flowing. In this manner the air or oxygen molecules in the gas are more intensely subjected to the ionizing process through which $O_2$ is converted into $O_3$.

The invention enables a high yield of $O_3$ to be produced in a relatively simple and cheap apparatus. Preliminary tests indicate that a higher percentage of the oxygen is transformed to ozone in a compact apparatus and with measurably lower current consumption per pound than is obtainable from equipment now used.

My invention may be more fully understood by reference to the accompanying drawings, in which.

Figure 1:
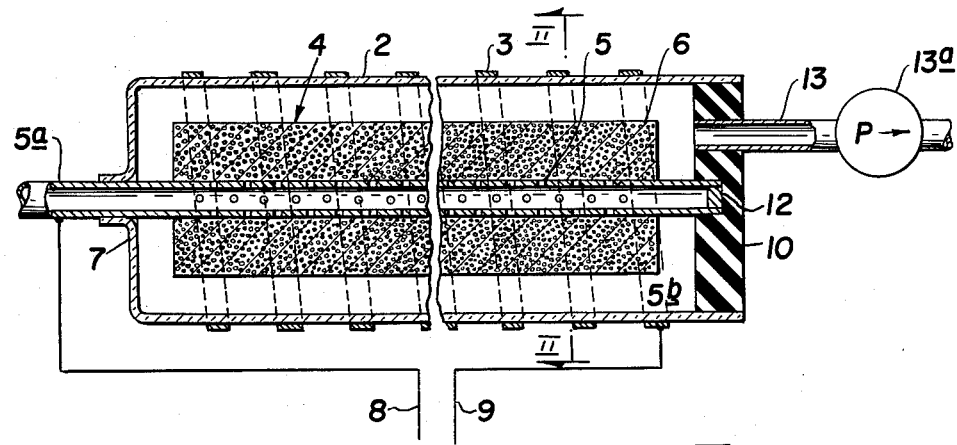
FIG. 1 is a more or less schematic longitudinal section through an ozonator embodying my invention.
Figure 2:
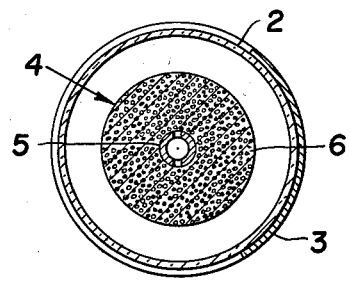
FIG. 2 is a transverse section in the plane of line II—II of FIG. 1.

Referring first to FIGS. 1 and 2 of the drawings, 2 designates a tubular elongated vessel or casing formed of insulating material, such as glass. Around the exterior thereof is a conductor such as a coil of wire 3, constituting an electrode.

Within the vessel and extending coaxially thereof is a core or composite electrode structure designated generally as 4. It comprises a perforated metal supporting tube 5 about which is formed a porous mass 6 of electrically-conductive particles insulated from one another, as hereinafter more fully described. One end 5a of the tube 5 is imperforate and extends through an end wall 7 closing one end of the tube 2, and there is a seal between the tube and the end wall to exclude the flow of air around the metal tube into the vessel. The coil 3 and the tube 5—5a are connected through wires 8 and 9 respectively to a source of high voltage current (not shown). The current may be of the order of 15,000 volts, more or less, depending upon the dimensions of the apparatus.

At the other end of the tubular vessel is an insulating plug or end member 10 providing at its center a support for the opposite end 5b of the tube 5, this end also being imperforate and closed by a plug 12. There is a gas outlet tube 13 passing through the end member 10.

Aluminum granules or particles preferably of the order of fifty to twenty-five thousandths of an inch (.050"–.025") are used as the conductive particles in the mass 6. They may be graded to uniform size, or assorted, and the size range is not critical, except that any excess of fines which would make the mass too dense should be avoided. I may use small diameter aluminum wire, preferably chemically etched and chopped into short lengths. These particles, when exposed to air, develop an oxide film thereover, which is non-conductive, so that there can be no direct conductive path for current between adjacent particles. Also, the film may be developed under controlled conditions. The particles, when placed in a container, form a porous body with innumerable small interstices between particles. If the particles be first wetted with sodium silicate solution before they are introduced into the vessel, an additional insulating film of hydroxide will be formed on the metal particles to more effectively insulate them, and as the sodium silicate dries, the particles will be bonded together and molded to the required shape.

Figure 3:
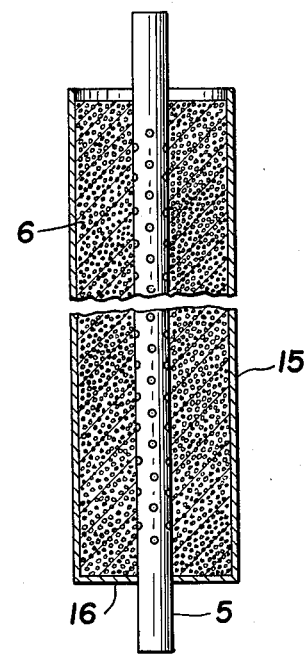
FIG. 3 illustrates schematically a method of forming the core or electrode for the apparatus.

This is illustrated in FIG. 3. There is an elongated receptacle 15 of the length and diameter of the mass 6. It has a closed end 16, and 5 is the perforated metal tube. The mold is filled with aluminum particles or granules as above described that have previously been wetted with a solution of sodium silicate, the silicate not being dry when the particles are placed in the mold. The material is lightly compacted to prevent there being large voids, but not compressed or compacted to such extent as to render it too dense or non-porous. When the silicate has dried, the particles will be bonded together and the mass will hold its form. Low pressure air may be supplied to the metal tube 5 so that the perforations in the tube will not be plugged by the surrounding mass of bonded metal particles as the mold is filled and the mass hardened. The mass will at the same time be bonded and sealed to and about tube 5. I prefer that the radial thickness of the mass be thicker than the walls of the tube 5, and of a thickness of ⅜" or more, so that air must seek diverse channels through the mass, and its retention time adequate to secure intimate exposure to ionizing areas between particles.

I have indicated a suction pump 13a in the discharge line 13 for drawing atmospheric air through the tube 5, the porous mass 6, and out tube 13, as this will attenuate the air flowing through the mass, but a pressure pump at the inlet end of pipe 15 may be used.

Instead of using air, I may use air enriched with oxygen, or oxygen of commercial or high purity, or oxygen with an inert gas. If desired, the electrode 3 may surround the core 4 inside the vessel 2 instead of being on the exterior. Moreover, the gas flow may be reversed, although I prefer that it be in the direction above described.

Aluminum particles, because of their oxide coating, are preferred, but other metal particles wetted with a bonding material such as a resin may be used, the bonding material forming insulation about the particles. Sodium silicate as a bonding agent is inorganic and hence is desirable where high concentrations of oxygen are processed.

In operation, with a proper voltage applied to the electrodes, numerous tiny coronas or discharges occur between the particles in the mass. The air or oxygen-bearing gas is broken up into fine streams that move with impeded flow through the mass, so that the velocity in any given channel of flow is relatively low. The oxygen is thus intimately subjected to the ionizing action of numerous corona discharges, and with lower current consumption than has been heretofore possible changed from $O_2$ to $O_3$ and with a higher yield of $O_3$. The ozone laden gas or air removed from the unit may then be used directly in processes requiring dilute ozone, or the ozone may be separated from the gases with which it is mixed and concentrated, such procedures being now well known in the art.

I claim:

1. An ozone generator comprising spaced electrodes connected with opposite poles of a high voltage source, a porous core interposed between the electrodes, said core being comprised of metal particles individually enveloped in an insulating film and bonded together, and means for forcing oxygen-bearing gas through the core and collecting the same.

2. An ozone generator as defined in claim 1 in which the porous core is attached to one of the electrodes.

3. An ozone generator as defined in claim 2 in which the porous core is attached to one of the electrodes and in spaced relation to the other one.

4. An ozone generator as defined in claim 1 in which the porous core is formed of aluminum granules, the particles having an insulating oxide film developed thereover, and a bonding medium.

5. An ozone generator as defined in claim 1 in which the porous core is comprised of a shaped mass of aluminum particles individually surrounded with and bonded by sodium silicate.

6. An ozone generator as defined in claim 1 in which the porous core is formed of deep etched aluminum wire chopped into fragments.

7. An ozone generator comprising an enclosure, a porous core within the enclosure comprised of metal particles having an insulating film thereover bonded together, means for forcing oxygen-bearing gas through said porous core, means for generating an ionizing electric field between the area of the core where the gas enters the core and the area where it emerges from the core, and means for withdrawing gas which has passed through the core from the enclosure.

8. An ozone generator comprising a composite electrode element having a perforated metal support, a formed porous mass of metal particles individually enveloped in an insulating film and bonded together mounted on the support, a second electrode spaced from the composite electrodes and insulated therefrom, means for connecting the electrodes with opposite poles of a high voltage current source, means for removing gas from the space between the two electrodes, means for supplying oxygen-bearing gas to the perforated support from which it permeates through the porous mass to said space, and an enclosure for excluding from said space gas other than that which passes through the perforated support.

9. An ozone generator comprising a porous cylindrical core of bonded metal particles individually insulated from one another by an enveloping thin film, a tube extending axially through the core and being perforated along its length within the core, the tube having an imperforate terminal, the tube and core constituting a composite electrode structure, a second electrode concentrically positioned about the core in spaced relation thereto and insulated therefrom, end closures for excluding air from the structure through one of which said imperforate terminals of the tube passes and in which it is sealed for excluding air from the structure except that which enters the tube and passes through the porous core, means for withdrawing air from the space between the core and the surrounding electrode, and means for maintaining a high voltage potential difference across the two electrodes.

References Cited in the file of this patent

UNITED STATES PATENTS

| | | |
|---|---|---|
| 935,457 | Bridge | Sept. 28, 1909 |
| 1,729,343 | Haas | Sept. 24, 1929 |
| 1,942,763 | Menshon | Jan. 9, 1934 |